Patented Aug. 17, 1948

2,447,288

UNITED STATES PATENT OFFICE 2,447,288

PRIMARY ALIPHATIC AMINE SALTS OF DI-ALIPHATIC SUBSTITUTED MONO-THIO-PHOSPHORIC ACIDS

Herschel G. Smith, Wallingford, Troy L. Cantrell, Lansdowne, and Mark L. Hill, Yeadon, Pa., assignors to Gulf Oil Corporation, Pittsburgh, Pa., a corporation of Pennsylvania No Drawing. Application March 6, 1946, Serial No. 652,482

5 Claims. (Cl. 260—461)

This invention relates to new chemical compounds that impart desirable properties to various mineral oil fractions and compositions and more particularly to primary aliphatic amine salts of di-aliphatic substituted mono-thiophosphoric acids which have the following general formula:

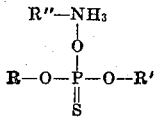

in which R and R' each denote a branched chain aliphatic group containing at least 5 carbon atoms, and R" stands for a straight chain primary aliphatic group containing at least 8 carbon atoms.

This invention has as an object the production of new chemical compounds that are valuable additives for mineral oil fractions and compositions. A further object is to manufacture new chemical compounds which are capable of retarding the corrosion of metals. A still further object is to manufacture new chemical compounds which are useful for decreasing the foaming tendencies of mineral oils. Other objects will appear hereinafter.

These objects are accomplished in accordance with the present invention by preparing new chemical compounds having the general formula set forth hereinabove by reacting di-aliphatic substituted mono-thiophosphoric acids with normal straight chain primary aliphatic amines containing at least 8 carbon atoms. Any of the di-aliphatic substituted mono-thiophosphoric acids used in the aforementioned reaction may be prepared by reacting one mol of thiophosphoryl chloride (PSCl₃) with two mols of one or a mixture of several branched chain aliphatic alcohols containing at least 5 carbon atoms followed by hydrolysis of the di-aliphatic substituted thiophosphoryl chloride thus formed. It has been found preferable to use an unsymmetrical di-aliphatic substituted mono-thiophosphoric acid prepared by interaction of equimolecular quantities of thiophosphoryl chloride and two different branched chain aliphatic alcohols containing at least 5 carbon atoms.

The normal straight chain primary aliphatic amines used in preparing the compounds of the present invention contain at least 8 carbon atoms and preferably contain from 10 to 20 carbon atoms. Usually normal straight chain primary alkyl amines such as octyl amine, decyl amine, undecyl amine, dodecyl amine, tetradecyl amine, cetyl amine, octadecyl amine and eicosyl amine are employed, but it is also permissible to use unsaturated straight chain primary aliphatic amines such as decenyl amine, undecenyl amine, dodecenyl amine, hexadecenyl amine, 9,10-octadecenyl amine (also called oleyl amine), and eicosenyl amine. Mixtures of the straight chain primary alkyl amines, such as cocoamine, are often used because of their relative cheapness. Cocoamine is a commercial mixture of higher alkyl amines prepared from coconut oil fatty acids. It contains a major amount of primary dodecyl amine, and typical samples thereof have been found to have average molecular weights ranging from 200 to 210.

Among the various branched chain aliphatic alcohols containing at least 5 carbon atoms which may be reacted with thiophosphoryl chloride to form the di-aliphatic substituted thiophosphoryl chlorides which are used in the preparation of the compounds of the present invention there may be mentioned 3-methyl-butanol, 2-methyl-butanol, tertiary butyl carbinol, 1-methyl-butanol, tertiary amyl alcohol, isohexanol, the various branched chain heptanols, 1-methyl-heptanol, 2-ethyl-hexanol, and other branched chain octanols. It is preferred to use saturated branched chain aliphatic alcohols containing from 5 to 8 carbon atoms, but it is permissible to use unsaturated alcohols such as the branched chain pentenols, hexenols, heptenols and octenols. The preferred compounds of the present invention are derivatives of unsymmetrical dialkyl thiophosphoryl chlorides which are prepared by reacting thiophosphoryl chloride with equimolecular proportions of two different branched chain alkanols having from 5 to 8 carbon atoms.

When the compounds of the present invention are made from an unsaturated alcohol and/or an unsaturated amine, so that one or more of the groups R, R' and R" of the general formula given above are unsaturated it is often desirable to saturate such groups by sulfurization. The sulfurization of compounds having these unsaturated groups yields final products which increase the oiliness of lubricating oils to which they are added.

One of the preferred compounds of the present invention is the cocoamine salt of 3-methyl-butyl, 2-ethyl-hexyl monothiophosphoric acid which has the formula:

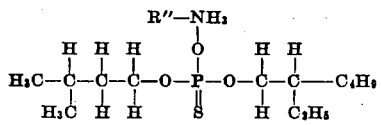

wherein R'' stands for the mixture of alkyl radicals contained in cocoamine. The manufacture and properties of this compound are stated in the following example in which parts are by weight.

*Example*

88 parts (1 mol) of 3-methyl-butanol and 130 parts (1 mol) of 2-ethyl-hexanol are gently heated at about 50 to 100° C. with 169.4 parts (1 mol) of thiophosphoryl chloride ($PSCl_3$) until no more hydrogen chloride is given off by the reaction mixture. The 3-methyl-butyl, 2-ethyl-hexyl thiophosphoryl chloride thus formed is then converted to 3-methyl-butyl, 2-ethyl-hexyl mono-thiophosphoric acid by hydrolysis with an equimolecular proportion of water while gently heating to drive off the hydrogen chloride evolved. The 3-methyl-butyl, 2-ethyl-hexyl mono-thiophosphoric acid is then heated below 180° F. with an equimolecular proportion of cocoamine thereby forming the cocoamine salt of 3-methyl-butyl, 2-ethyl-hexyl, mono-thiophosphoric acid, and the pH of this product is adjusted to lie between 5.5 and 7.5 by the procedure described in the final paragraph of U. S. Patent No. 2,371,853. When 50 parts of this cocoamine salt are blended with 50 parts of a turbine lubricating oil having the properties indicated in the table below, an oil concentrate of this cocoamine salt is obtained which has a gravity of 25.7° A. P. I., a viscosity of 206 S. U. V. at 100° F., a pour point of +45° F., and a color (N. P. A.) of 4.75. This concentrate may be dissolved in various mineral oil fractions and compositions in order to impart desirable properties thereto.

The normal primary aliphatic amine salts of di-aliphatic substituted mono-thiophosphoric acids which are comprehended by the present invention are very useful additives for mineral oil fractions and compositions. They impart to mineral oils to which they have been added at least two beneficial properties: (1) an ability to retard corrosion of metals and (2) a reduction in the tendency of the oil to froth and foam. These amine salts of this invention are usually dissolved in mineral oils in amounts ranging from 0.01% to 10% based on the weight of the oil. When from 0.01% to 10% of one of these amine salts is added to a lubricating oil it gives to said oil a rust preventing property and also decreases the tendency of said oil to foam. In other words, these new additives are both corrosion inhibitors and foam suppressors. Because of their corrosion inhibiting properties these new compounds of the present invention are useful additives for rust preventive coating compositions, such as slushing oils, which are prepared from hydrocarbon oils or mixtures of hydrocarbon oils with waxes and/or asphalt.

The following table illustrates the comparative properties of a turbine lubricating oil and turbine lubricating compositions made by adding 0.5% and 0.2% respectively of the cocoamine salt of 3-methyl-butyl, 2-ethyl-hexyl mono-thiophosphoric acid to said oil.

*Table*

| | | | |
|---|---|---|---|
| Make-up: Percent of inhibitor by weight | nil | 0.5 | 0.2 |
| Gravity: °API | 28.4 | 28.3 | 28.3 |
| Viscosity, SUV: | | | |
| 100° F | 106.8 | 107.3 | 107.1 |
| 210° F | 39.0 | 39.1 | 38.9 |
| Flash, OC: °F | 340 | 340 | 340 |
| Fire, OC: °F | 385 | 385 | 385 |
| Color, N. P. A | 1.75 | 1.75 | 1.75 |
| Corrosion test, A. S. T. M. D665-44T: | | | |
| Synthetic sea water, 140° F., 48 hr.— | | | |
| Steel strip: appearance | rust | bright | bright |
| Air bubbling foam test, Method of Patent No. 2,380,679: | | | |
| Vol. oil and foam: vol. of oil— | | | |
| 77° F | 3.92 | 1.2 | 1.1 |
| 130° F | 1.35 | 1.1 | 1.05 |
| 180° F | 1.26 | 1.1 | 1.05 |

Resort may be had to such modifications and variations as fall within the spirit of the invention and the scope of the appended claims.

What we claim is:

1. A primary aliphatic amine salt of a di-aliphatic substituted mono-thiophosphoric acid, said salt having the following general formula:

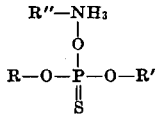

wherein R and R' each denote a branched chain aliphatic group selected from the class consisting of alkyl, alkenyl and sulfurized alkenyl groups containing from 5 to 8 carbon atoms, and R'' stands for a straight chain primary aliphatic group selected from the class consisting of alkyl, alkenyl and sulfurized alkenyl groups containing at least 8 carbon atoms.

2. A primary aliphatic amine salt of a di-alkyl mono-thiophosphoric acid, said salt having the following general formula:

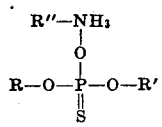

wherein R and R' denote branched chain alkyl groups each of which contains from 5 to 8 carbon atoms, and R'' stands for a straight chain primary aliphatic group selected from the class consisting of alkyl, alkenyl and sulfurized alkenyl groups containing from 10 to 20 carbon atoms.

3. A primary aliphatic amine salt of an unsymmetrical di-alkyl mono-thiophosphoric acid, said salt having the following general formula:

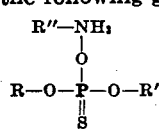

wherein R and R' denote different branched chain alkyl groups each of which contains from 5 to 8 carbon atoms, and R'' stands for a straight chain primary aliphatic group selected from the class consisting of alkyl, alkenyl and sulfurized alkenyl groups containing from 10 to 20 carbon atoms.

4. A primary alkyl amine salt of 3-methyl-butyl, 2-ethyl-hexyl mono-thiophosphoric acid, said salt having the following general formula:

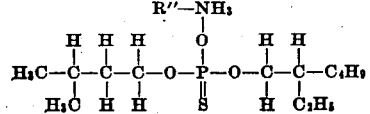

wherein R" stands for a straight chain primary alkyl group containing from 10 to 20 carbon atoms.

5. The cocoamine salt of 3-methyl-butyl, 2-ethyl-hexyl mono-thiophosphoric acid.

HERSCHEL G. SMITH.
   TROY L. CANTRELL.
   MARK L. HILL.

REFERENCES CITED

The following references are of record in the file of this patent:

UNITED STATES PATENTS

| Number | Name | Date |
|---|---|---|
| 2,063,629 | Salzberg et al. | Dec. 8, 1936 |
| 2,167,867 | Benning | Aug. 1, 1939 |
| 2,252,984 | Rutherford et al. | Dec. 19, 1941 |
| 2,344,392 | Cook et al. | Mar. 14, 1944 |
| 2,346,155 | Denison et al. | Apr. 11, 1944 |
| 2,368,000 | Cook et al. | Jan. 23, 1945 |
| 2,389,718 | Davis | Nov. 27, 1945 |

OTHER REFERENCES

Karrer, "Organic Chemistry," 1st English ed. (1938), page 848.